United States Patent
Zhong et al.

(10) Patent No.: US 9,787,102 B2
(45) Date of Patent: Oct. 10, 2017

(54) AUXILIARY CIRCUITS FOR SELECTION AND ENHANCEMENT OF MULTI-FREQUENCY WIRELESS POWER TRANSFER TO MULTIPLE LOADS

(71) Applicant: THE UNIVERSITY OF HONG KONG, Hong Kong (CN)

(72) Inventors: Wenxing Zhong, Hong Kong (CN); Shu Yuen Ron Hui, Hong Kong (CN)

(73) Assignee: THE UNIVERSITY OF HONG KONG, Hong Kong (CN)

( * ) Notice: Subject to any disclaimer, the term of this patent is extended or adjusted under 35 U.S.C. 154(b) by 739 days.

(21) Appl. No.: 14/178,987

(22) Filed: Feb. 12, 2014

(65) Prior Publication Data

US 2015/0228402 A1    Aug. 13, 2015

(51) Int. Cl.
| | |
|---|---|
| H02J 50/50 | (2016.01) |
| H02J 5/00 | (2016.01) |
| H02J 50/40 | (2016.01) |
| H02J 50/12 | (2016.01) |
| H02J 17/00 | (2006.01) |

(52) U.S. Cl.
CPC ............. *H02J 5/005* (2013.01); *H02J 17/00* (2013.01); *H02J 50/12* (2016.02); *H02J 50/40* (2016.02); *H02J 50/50* (2016.02)

(58) Field of Classification Search
CPC ............. H02J 5/005; H02J 7/025; H02J 17/00
See application file for complete search history.

(56) References Cited

U.S. PATENT DOCUMENTS

| | | | | |
|---|---|---|---|---|
| 1,119,732 | A | 12/1914 | Tesla et al. | |
| 4,450,431 | A * | 5/1984 | Hochstein | B60C 23/0428 340/447 |
| 2010/0308939 | A1* | 12/2010 | Kurs | H02J 5/005 333/219.2 |
| 2011/0018494 | A1* | 1/2011 | Mita | H02J 7/025 320/108 |
| 2011/0169338 | A1* | 7/2011 | Kozakai | H02J 5/005 307/104 |
| 2012/0001497 | A1* | 1/2012 | Sada | H02J 5/005 307/104 |
| 2012/0169137 | A1* | 7/2012 | Lisi | H02J 5/005 307/104 |
| 2012/0248889 | A1* | 10/2012 | Fukushi | H02J 17/00 307/104 |

(Continued)

OTHER PUBLICATIONS

Marco, D.; Mauro, M., "Multi Band Resonators for Wireless Power Transfer and Near Field Magnetic Communications", 2012, IEEE.

(Continued)

*Primary Examiner* — Rexford Barnie
*Assistant Examiner* — David Shiao
(74) *Attorney, Agent, or Firm* — Leason Ellis LLP

(57) ABSTRACT

This invention is related to a novel method and apparatus that provides selective and enhanced power flow in wireless power transfer systems with multiple receivers. Auxiliary circuits are introduced in the receiver circuits (and relay circuits if applicable) so as to ensure proper frequency-selective wireless power flow to the appropriate targeted receivers, with the pickup power by the non-targeted receivers substantially reduced even if the chosen tuned frequencies for different receivers are not widely apart.

8 Claims, 9 Drawing Sheets

(56) References Cited

U.S. PATENT DOCUMENTS

| | | | | |
|---|---|---|---|---|
| 2013/0200717 | A1* | 8/2013 | Bourilkov | H02J 7/025 307/104 |
| 2014/0035383 | A1* | 2/2014 | Riehl | H01F 38/14 307/104 |
| 2014/0070624 | A1* | 3/2014 | Kim | H02J 5/005 307/104 |
| 2014/0091635 | A1* | 4/2014 | Sugino | H01F 38/14 307/104 |
| 2014/0285027 | A1* | 9/2014 | Sakamoto | B60L 11/182 307/104 |
| 2014/0354220 | A1 | 12/2014 | Liu | |
| 2015/0048790 | A1* | 2/2015 | Rudser | H02J 7/025 320/108 |
| 2015/0054345 | A1* | 2/2015 | Monat | H01F 38/14 307/104 |
| 2015/0115727 | A1* | 4/2015 | Carobolante | H02J 5/005 307/104 |

OTHER PUBLICATIONS

Wireless Charging Market by Technology, Range, Component (Transmitters and Receivers for Various Devices), Application (Consumer Electronics, Defense, Healthcare, Automotive, and Industrial) http://www.marketsandmarkets.com/Market-Reports/wireless-charging-market-640.html.

Opportunities for Wireless Power Transmission: Consumer Electronics (Technical Insights), Frost and Sullivan, D4A1-TI, Jun. 2012.

Z. Pantic, K. Lee and S. Lukic, "Inductive power transfer by means of multiple frequencies in the magnetic link", IEEE Energy Conversion Congress and Exposition (ECCE), Denver, USA, Sep. 2013, pp. 2912-2919.

C.K. Lee, W.X. Zhong and S.Y.R. Hui, "Effects of Magnetic Coupling of Non-adjacent Resonators on Wireless Power Domino-Resonator Systems", IEEE Trans. Power Electronics, vol. 27, No. 4, pp. 1905-1916, Apr. 2012.

\* cited by examiner $f_1$ and $f_2$

1). For $f_1$          2). For $f_2$

AUXILIARY CIRCUITS FOR SELECTION AND ENHANCEMENT OF MULTI-FREQUENCY WIRELESS POWER TRANSFER TO MULTIPLE LOADS

FIELD OF THE INVENTION

The present invention relates to wireless power transfer, and more particularly, to multi-frequency wireless power transfer.

BACKGROUND OF THE INVENTION

Wireless power transfer technology has re-emerged as a viable technology for domestic and industrial applications. Recently, multiple-frequency wireless power transmission has been proposed as a means to enhance wireless power transfer. In the article by K. Lee and S. Lukic entitled "Inductive power transfer by means of multiple frequencies in the magnetic link," IEEE Energy Conversion Congress and Exposition (ECCE), Denver, USA, September 2013, pp: 2912-2919, multi-resonant tanks are used at the transmitter and receiver to amplify and extract power at multiple frequencies. In the Lee article, the power transfer is carried out at a fundamental frequency of 25 kHz and a third harmonic of 75 kHz. Power transfer is spread over more than one frequency so as to increase the power transfer. Single-frequency receivers are used to receiver power sent at different frequencies. For example, if the targeted receiver is tuned at 25 kHz, then transmitting power at 25 kHz will theoretically transfer power to the receiver coil tuned at 25 kHz. The receiver coil tuned at 75 kHz will be the non-targeted receiver and will not receive any power. However, such an approach still has major limitations. A major limitation among them, is that the residual power will be picked up by the non-targeted receiver unless the chosen frequencies are widely separated and/or the quality factors of the resonators are very high (and thus very expensive). The choice of widely separated frequencies also leads to considerable technical and cost constraints on the power transmitter design and the coil resonator design. In the Lee article, the fundamental frequency (25 kHz) and the third harmonic (75 kHz) are added together and the sum of these current components is generated by the power transmitter. However, independent control of the power transfer rates at the two different frequencies cannot be easily controlled.

Some key issues of using multi-frequency for wireless power transfer (WPT) can be understood with reference to the WPT system layout shown in FIG. 1. In FIG. 1 the transmitter T is assumed to be able to operate at more than one frequency. For simplicity, it is assumed that the transmitter can be operated at two operating frequencies, $f_1$ and $f_2$ and that the WPT system has two receivers, A and B, tuned to receive power at frequencies $f_1$ and $f_2$, respectively. In this way, the power flow of each receiver can be controlled separately by controlling the power source with the corresponding frequency.

For simplicity, the relay resonator R is not included in this part of the analysis. The lumped circuit model of the two-receiver system with series compensation is shown in FIG. 2 and its circuit equations are listed below for one operating frequency.

$$(R_T + jX_T)I_T + j\omega M_{TA}I_A + j\omega M_{TB}I_B = V_S \quad (1)$$

$$j\omega M_{TA}I_T + (R_A + jX_A)I_A + j\omega M_{AB}I_B = 0 \quad (2)$$

$$j\omega M_{TB}I_T + j\omega M_{AB}I_A + (R_B + jX_B)I_B = 0 \quad (3)$$

where $\omega = 2\pi f$; $R_T$ is the total resistance in the transmitter loop which includes the source resistance of the source and the parasitic resistance of the inductor and the capacitor; $R_A$ and $R_B$ are the resistances in the two receiver loops which include the "load" resistance ($R_{LN}$) (assuming pure resistive load in this analysis) and the "parasitic" resistance ($R_{PN}$) of the inductors and the capacitors for N=A or B; $X_N$ is the reactance in loop N which equals $\omega L_N - 1/(\omega C_N)$. For example, for Receiver-A, $R_A = R_{PA} + R_{LA}$.

The main power transfer path for each receiver is from the transmitter to the receiver directly. If the receiver is tuned at the operating frequency of the transmitter, the receiver is called the "targeted" receiver. Otherwise, it is called the "non-targeted" receiver. Assume that Receiver-A is tuned to $f_1$, and Receiver-B is tuned to $f_2$. Since Receiver-A and Receiver-B consist of resonators, they are also referred as Resonator-A and Resonator-B.

In the example of FIG. 1, the main power transfer path for frequency f1 is T-A because Receiver-A is the targeted receiver, and the power transfer path T-B-A is traditionally blocked for the power flow of $f_1$ in order to reduce the power reception in Resonator-B at $f_1$. Thus, the example in FIG. 1 can be considered as the combination of two 2-resonator systems. The electrical pioneer Nikola Tesla proved that the resonant frequency of the receiver should equal the operating frequency in order to obtain maximum power transfer efficiency for a 2-resonator system. See the Lee article and U.S. Pat. No. 1,119,732 of N. Tesla entitled "Apparatus for transmitting electrical energy," which issued Dec. 1, 1914. Therefore, the resonant frequency of Resonator-A should be equal to $f_1$ and the resonant frequency of Resonator-B should be equal to $f_2$. Thus, $$\omega_1 = \frac{1}{\sqrt{L_A C_A}} \text{ and } \omega_2 = \frac{1}{\sqrt{L_B C_B}} \quad (4)$$

For each receiver that behaves like a tuned resonator, it operates like a band pass filter. Take Resonator-A as an example. Its current $I_A(f)$ can be expressed as:

$$I_A(f) = \frac{\omega M_{TA} I_T}{\sqrt{R_A^2 + X_A^2}} = \frac{\omega M_{TA} I_T}{\sqrt{R_A^2 + \left(\omega L_A - \frac{1}{\omega C_A}\right)^2}} = \quad (5)$$

$$\frac{\omega M_{TA} I_T}{\sqrt{\frac{\omega_1^2 L_A^2}{Q_{A1}^2} + \omega^2 L_A^2 \left(1 - \frac{\omega_1^2}{\omega^2}\right)^2}} = \frac{M_{TA} I_T}{L_A \sqrt{\frac{\omega_1^2}{\omega^2 Q_{A1}^2} + \left(1 - \frac{\omega_1^2}{\omega^2}\right)^2}}$$

where $\omega_1 = \sqrt{L_A C_A}$; $Q_{A1} = \omega_1 L_A / R_A$ is the Quality Factor of resonator-A at the resonant frequency. FIG. 3 shows the current variations according to the operating frequency f and the quality factor $Q_{A1}$. It is important to note that the shape of the current-frequency characteristic depends on the Quality Factor (or Q-factor) of the coil resonator. A sharp current-frequency characteristic is only possible if the Q-factor is very high (say Q=1000 which is difficult to achieve at low cost). In general, this current-frequency characteristic exhibits a bell-shaped curve with its peak at or near the resonant frequency. Therefore, if the tuned resonant frequency of the non-target receiver is close to that of the target receiver, the non-target receiver will also pick up some current and therefore unintentionally some power.

This unintentional power pickup by the non-target receiver is called "cross interference." On the other hand, if the Q-factor is very high and the current-frequency curve is very sharp, a slight deviation of the operating frequency due to various reasons, such as temperature drift of component values, may cause the power transfer to be reduced drastically.

It is important to note that in the traditional approach the non-targeted receiver resonator is normally not used because it is not the targeted receiver. However, it has been demonstrated that a 3-coil wireless power transfer system (with one relay coil-resonator) can achieve higher energy efficiency than the 2-coil counterpart under some design conditions. See, X. Liu, "Inductive power transfer using a relay coil", U.S. patent application Ser. No. 13/907,483, filed on 31 May 2013.

From equations (2) and (3), the ratio between the currents in Resonator-A and Resonator-B can be expressed as $$\frac{I_2}{I_3} = \frac{M_{TA}R_B + j(M_{TA}X_B - \omega M_{TB}M_{AB})}{M_{TB}R_A + j(M_{TB}X_A - \omega M_{TA}M_{AB})} \quad (6)$$

Because the method allows not only the wireless power transfer at a single frequency to the targeted receiver, but also multiple frequencies to multiple targeted receivers, the following explanations are not restricted to single-frequency operation.

In order to quantify the cross interference introduced by the undesired current in a targeted receiver, an index is proposed that is equal to the ratio of the maximum power caused by the undesired current harmonic and the interested minimum output power generated by the designated current harmonic in the receiver, which is a predetermined value. For example, if the rated output power of a receiver is 5 W, and the untargeted power needs to be limited to within 5% of the targeted power even when the output power is as low as 1/10 of the rated power, then the interested minimum output power of this receiver is 0.5 W. Assuming the general case of transmitting power at both of the frequencies $f_1$ and $f_2$ in FIG. 1, for Resonator-A, the index is $$\delta_A = \frac{P_{A2max}}{P_{A1min}} \quad (7)$$

where $P_{A2max}$ is the maximum power caused by the current of $f_2$ and $P_{A1min}$ is the interested minimum power caused by the current of $f_1$ in the equivalent load $R_A$.

Similarly, for Resonator-B, $$\delta_B = \frac{P_{B1max}}{P_{B2min}} \quad (8)$$

where $P_{B1max}$ is the maximum power caused by the current of $f_1$ and $P_{B2min}$ is the interested minimum power caused by the current of $f_2$ in the equivalent load $R_B$. It can be seen from equations (7) and (8) that a large index implies that the cross interference is significant and the situation is not desirable.

By utilizing equations (6), (7) and (8) the index can be re-written as $$\delta_A = \frac{P_{B2max}R_{LA}}{P_{A1min}R_{LB}} \cdot \frac{M_{TA}^2 R_B^2 + \omega_2^2 M_{TB}^2 M_{AB}^2}{M_{TB}^2 R_A^2 + (M_{TB}L_A(\omega_2 - \omega_1^2/\omega_2) - \omega_2 M_{TA}M_{AB})^2} \quad (9)$$

$$\delta_B = \frac{P_{A1max}R_{LB}}{P_{B2min}R_{LA}} \cdot \frac{M_{TB}^2 R_A^2 + \omega_1^2 M_{TA}^2 M_{AB}^2}{M_{TA}^2 R_B^2 + (M_{TA}L_B(\omega_1 - \omega_2^2/\omega_1) - \omega_1 M_{TB}M_{AB})^2} \quad (10)$$

A design example is shown in connection with the system of FIG. 4, wherein the given parameters are: $L_A$=$L_B$=81.3 µH; $R_{PA}$=$R_{PB}$=0.85Ω; $M_{TA}$=$M_{AB}$=2.6624 µH; $M_{TB}$=0.49 µH; $\delta_A$=10%; $\delta_B$=10%; $P_{A1max}$=$P_{B2max}$=2.5 W; $P_{A1min}$=$P_{B2min}$=0.25 W; $f_1$=600 kHz; $f_2$=500 kHz. The calculated values for the load resistance by solving equations (9) and (10) are $R_{LA}$=1.49Ω and $R_{LB}$=1.24Ω. The load resistance values are small in order to increase the quality factors of the receivers according to the previous analysis. However, the small load resistance values might lead to low efficiency. In this case, the overall efficiency is 48.2% while the possible maximum efficiency of the system is 59.6% if the load resistance values are optimized, which are $R_{LA}$=10.06Ω and $R_{LB}$1.76Ω. The load resistance and the operating frequencies could be further adjusted to obtain higher power transfer efficiency, but there are always compromises to make between the frequency difference and the efficiency (decided by operating frequencies and load resistance values). Also, it should be noted that equations (9) and (10) are only valid for a narrow frequency range in which the AC resistance of the resonator can be considered as constant.

In addition to the difficulty of achieving high efficiency, the drawbacks of the traditional method also include that: (1) it cannot remove the undesired current substantially; (2) the indirect power transfer paths (for example T-A-B for Resonator-B in the system in FIG. 4) are not utilized, which is a waste of the power transfer capability of the system; and (3) the interferences are highly sensitive to the resonant frequencies of the resonators (i.e. the inductance and capacitance values of the resonator) due to the high quality factors.

There are many practical applications in which indirect power paths should be utilized in order to raise the power transfer capability. For example, for the system shown in FIG. 4, the direct path for Resonator-B is T-B and the indirect power path is T-A-B. The power transfer efficiency of the system will be much lower if only the direct path is used. It has been demonstrated by the inventors that the cross-coupling (or indirect) power transfer paths can be utilized to further increase the capacity of power transfer at a single frequency for a single load. See, C. K. Lee, W. X. Zhong and S. Y. R. Hui, "Effects of Magnetic Coupling of Non-adjacent Resonators on Wireless Power Domino-Resonator Systems", IEEE Trans. Power Electronics, vol. 27, no. 4, pp. 1905-1916, April 2012

SUMMARY OF THE INVENTION

The present invention is related to a method and apparatus for multi-frequency wireless power transfer systems in which the wireless power can be transmitted at one or more than one frequency through the wireless power transfer channel or channels from the transmitter, and received by one or more receivers according to their specifically-tuned frequencies. Auxiliary circuits comprising band-pass and/or band-stop circuits are incorporated into the receiver circuits and optionally relay circuits so as to facilitate the selection and enhancement of the wireless power transfer to the designated load without causing significant cross interference due to the use of multi-frequency wireless power flow control.

Receivers may consist of coils tuned at different resonant frequencies. If the power transmitter transmits energy at the tuned frequency of the receiver, that receiver is called the targeted receiver. Otherwise, it is called the non-targeted receiver. According to the present invention, the non-targeted receiver is used as a relay resonator to enhance the coupling, and therefore the power transfer, between the transmitter coil and the targeted receiver coil. As a result the method and auxiliary circuits of the present invention add advantages to WPT systems with multiple receivers because the non-targeted receiver (which is not used traditionally) will be used as a relay resonator.

The novel feature of this invention is that multi-frequency wireless power transmission is made possible for simultaneous power transfer to multiple targeted loads. Unlike other methods that use different frequencies to select the power transfer to different targeted loads, one unique feature of this invention is that the non-targeted receiver will automatically act as a relay resonator to enhance (i) magnetic coupling and thus (ii) the power transfer between the power transmitter and the targeted receiver.

A second novel feature of the present invention is that the chosen operating frequencies for the tuned receivers need not be widely separated because the auxiliary circuits consist of band-pass and/or band-stop filters which reduce any cross interference from the non-targeted frequency.

BRIEF DESCRIPTION OF THE DRAWINGS

The foregoing and other features of the present invention will e more readily apparent from the following detailed description and drawings of an illustrative embodiment of the invention in which.

DESCRIPTION OF AN ILLUSTRATIVE EMBODIMENT OF THE INVENTION

Figure 5:
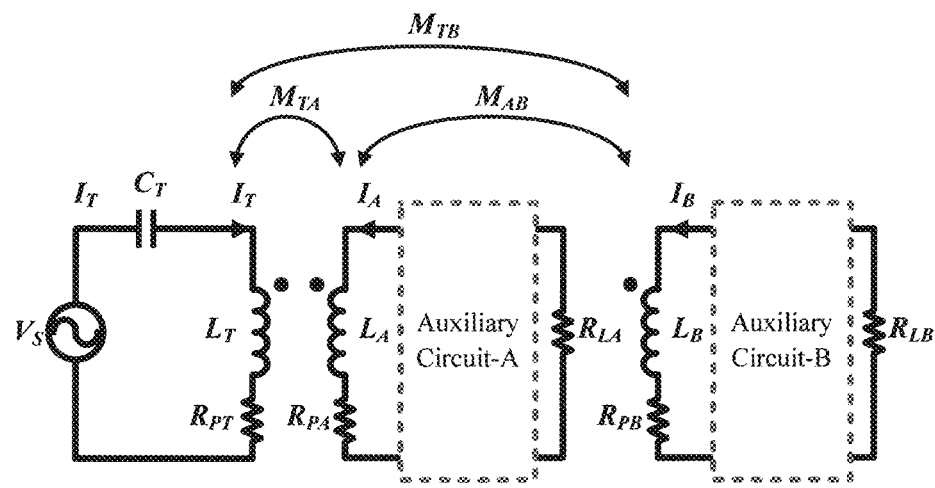
FIG. 5 is a schematic circuit of a multi-frequency wireless power transfer system utilizing auxiliary circuits according to the present invention.

According to the present invention, in order to utilize indirect power paths, new auxiliary circuits are provided as shown in FIG. 5. Assuming the tuned resonant frequencies of Resonator-A and Resonator-B are $f_1$ and $f_2$ respectively, the functions of the auxiliary circuit for the receivers are explained by means of the diagrams shown in FIG. 6.

FIGS. 6A-6D show four types of auxiliary circuits to cover the use of shunt resonant branches to bypass, and parallel resonant branches to block, the power flow of the non-targeted frequency, for series-connected and parallel-connected loads in the receivers. In the traditional approach, a receiver consists of a resonant inductor (L), a resonant capacitor (C) and a load R connected in series with the L and C or in parallel with C.

FIG. 6A shows an exemplary circuit that includes a shunt resonant branch to bypass current at the non-targeted frequency for a series-connected load. This circuit includes an auxiliary circuit (enclosed in the dotted box) for the coil of Receiver-A. The coil inductance is $L_A$ and the coil resistance is $R_{PA}$. For Receiver-A, $f_1$ is its targeted frequency and $f_2$ is its non-targeted frequency. In the auxiliary circuit for Receiver-A, the resonant branch comprising $L_2$ and $C_2$ is designed to resonate at the frequency $f_2$ so that it acts as a shunt circuit to short-circuit (bypass) the current caused by power transmission at frequency $f_2$. In this way, the current of the non-targeted frequency will circulate within a closed loop. This special phenomenon offers two advantageous functions.

First, if the transmitter is transmitting power at $f_2$, this current loop of $f_2$ will act as a relay loop resonator to enhance the magnetic coupling and power transfer between the transmitter and Receiver-B (which has a targeted frequency of $f_2$). Consequently, it provides an extra power flow path from the transmitter to Receiver-B.

Second, the circulating current of frequency $f_2$ in the closed loop $R_{PA}$-$L_A$-$C_{A2}$-$L_2$-$C_2$ will not affect the load $R_{LA}$ (which has its targeted frequency of $f_1$).

Note that the two capacitors CA1 and CA2 are used to form parts of the resonant circuit for the resonant frequency $f_1$ for the Receiver-A and that the shunt resonant circuit is connected between the ground and the junction of CA1 and CA2.

In order to design the circuit of FIG. 6A as Receiver-A, it is necessary for its resonant frequency to be tuned at or near the targeted frequency $f_1$. With the help of the equivalent circuit in FIG. 7, the designs of the resonant inductors and capacitors can be achieved. FIG. 7 shows the two equivalent circuits of FIG. 4—the one on the left for frequency $f_1$ and the one on the right for frequency $f_2$.

At an operating frequency $f_1$, it is necessary to design the equivalent circuit of Receiver-A in FIG. 7 so that it receives power at the targeted frequency of $f_1$. At $f_1$, the total impedance of the auxiliary circuit connected with the load $R_{LA}$ will be equivalent to that of a capacitance $C_{A1}$ in series with an equivalent load resistance $R_{LA}$. The total impedance of Receiver-A can be expressed as $$Z_A = R_{PA} + \frac{X_2^2 R_{LA}}{R_{LA}^2 + \left(X_2 - \frac{1}{\omega_1 C_{A1}}\right)^2} + \qquad (11)$$

$$j\left(\omega_1 L_A + \frac{X_2\left(R_{LA}^2 + \frac{1}{\omega_1^2 C_{A1}^2} - \frac{X_2}{\omega_1 C_{A1}}\right)}{R_{LA}^2 + \left(X_2 - \frac{1}{\omega_1 C_{A1}}\right)^2} - \frac{1}{\omega_1 C_{A2}}\right)$$

where $$X_2 = \omega_1 L_2 - \frac{1}{\omega_1 C_2}.$$

therefore, the expressions for the equivalent load resistance and capacitance are:

$$R'_{LA} = \frac{X_2^2 R_{LA}}{R_{LA}^2 + \left(X_2 - \frac{1}{\omega_1 C_{A1}}\right)^2} \qquad (12)$$

$$-\frac{1}{\omega_1 C'_{A1}} = \frac{X_2\left(R_{LA}^2 + \frac{1}{\omega_1^2 C_{A1}^2} - \frac{X_2}{\omega_1 C_{A1}}\right)}{R_{LA}^2 + \left(X_2 - \frac{1}{\omega_1 C_{A1}}\right)^2} - \frac{1}{\omega_1 C_{A2}} \qquad (13)$$

From equation (13), the equivalent capacitor $C'_{A1}$ can be calculated. Then the inductance $L_A$ and $C'_{A1}$ can be designed so that the $L_A$-$C'_{A1}$ branch forms a resonant tank at or near its targeted resonant frequency of $f_1$, where $$f_1 \approx \frac{1}{2\pi\sqrt{L_A C'_{A1}}} \qquad (14)$$

At $f_2$, $L_2$ and $C_2$ will bypass the current of $f_2$, therefore Resonator-A is equivalent to a repeater resonator with $C_{A2}$ as its compensating capacitor as shown in the equivalent circuit on the right of FIG. 7.

The design principle applied to FIG. 6A can be applied to FIG. 6B. The only difference is that in FIG. 6B, the load $R_{LA}$ is connected across the capacitor $C_{A1}$. Again, $L_2$ and $C_2$ are designed to form a bypass resonant tank for the non-targeted frequency $f_2$. Then the circuit of FIG. 6B can be transformed into the equivalent form shown in FIG. 7. Afterwards, the equations of the equivalent load $R'_{LA}$ and the equivalent capacitor $C'_{A1}$ specific for the circuit of FIG. 6B can be derived. From these equations, $C'_{A1}$ can be chosen with $L_A$ to form a resonant tank at a frequency at or near its targeted frequency according to equation (14).

Unlike the auxiliary circuits of FIG. 6A and FIG. 6B that use the series-connected $L_2$ and $C_2$ as a band-pass filter to short the current of the non-targeted frequency, those in FIG. 6C and FIG. 6D use the parallel-connected $L_2$ and $C_2$ as a band-stop filter to block the current of the non-targeted frequency $f_2$ from Receiver-A. FIG. 6C has the load $R_{LA}$ connected in series with the capacitor $C_{A1}$, while FIG. 6D has the load $R_{LA}$ connected in parallel with $C_{A1}$. Regardless of the series or parallel connection of the load, the design methodology for the auxiliary circuits of FIG. 6C and FIG. 6D follow similar principles as previously described. The auxiliary circuits can be transformed into the equivalent forms of FIG. 7. Then the equivalent load $R'_{LA}$ and equivalent capacitance $C'_{A1}$ equations can be derived. $L_A$ and $C'_{A1}$ can be designed together to satisfy equation (14).

The design methodology for Receiver-B is the same as that for Receiver-A, except that the targeted-frequency is $f_2$ instead of $f_1$.

Figure 6:
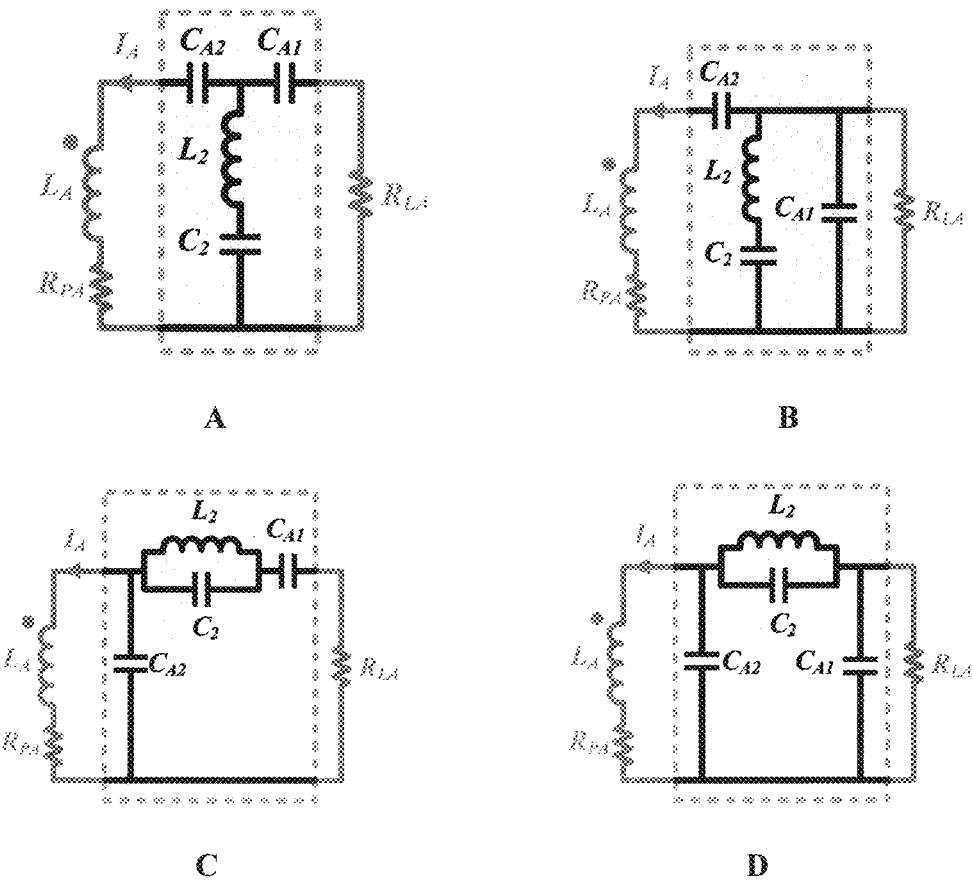
FIGS. 6A-6D show four types of auxiliary circuits which block power flow of a non-targeted frequency for series-connected and parallel-connected loads in the receivers.
Figure 7:
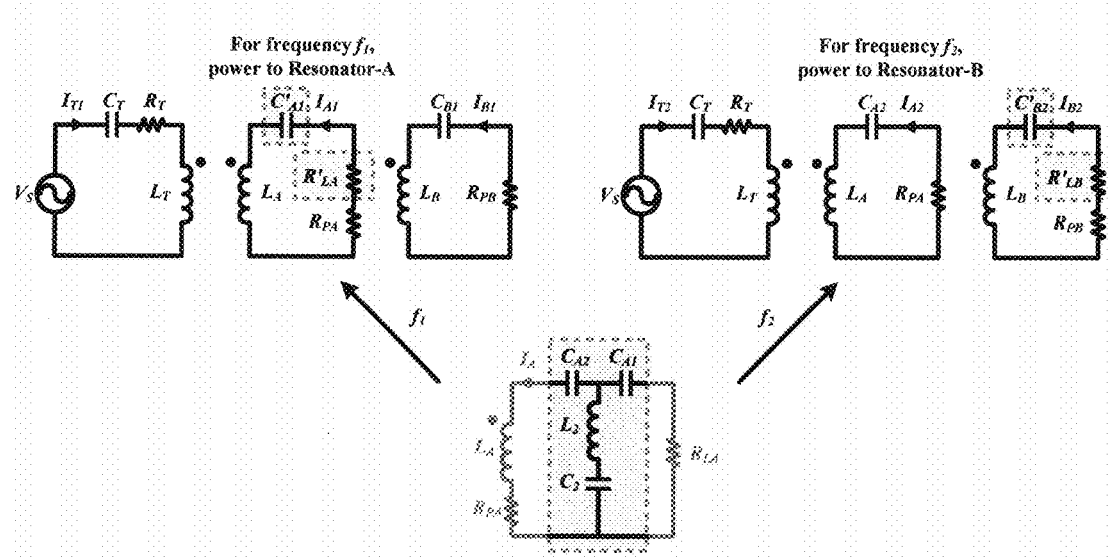
FIG. 7 shows the two equivalent circuits of FIG. 4 for the targeted and non-targeted frequencies.
Figure 8A:
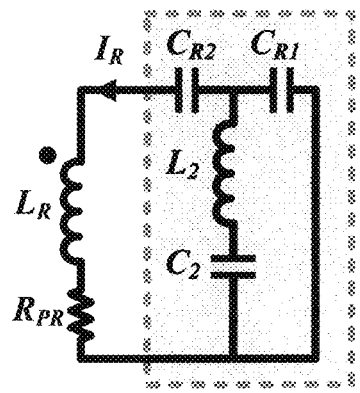
FIG. 8A shows an example of a relay resonator which can operate with two tuned frequencies.
Figure 8B:
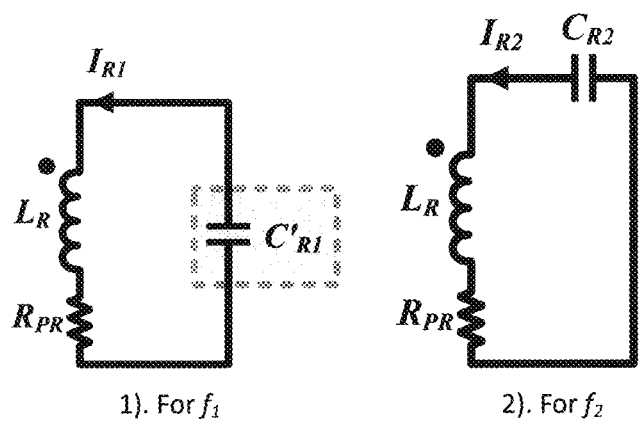
FIG. 8B shows the two equivalent circuits for the resonator portions for the two frequencies.

Basically, by replacing the loads in the proposed auxiliary circuits in FIG. 6 with a short circuit, the auxiliary circuits can be applied to a relay resonator. Such a resonator should be tuned to the multiple frequencies if they are used generally as relay resonators. FIG. 8A shows an example of a relay resonator which can operate with more than one tuned frequencies. In this example, it is tuned to work at frequencies $f_1$ and $f_2$. The two equivalent circuits for $f_1$ and $f_2$ are shown in FIG. 8B. At $f_1$, the whole auxiliary circuit indicated in the block has a capacitive impedance which can compensate $L_R$ and form a L-C resonance at $f_1$. At $f_2$, $L_2$ and $C_2$ will be resonant and form a short circuit to bypass $C_{R1}$, thereby causing $L_R$ and $C_{R2}$ to form an L-C resonance at $f_2$.

Figure 1:
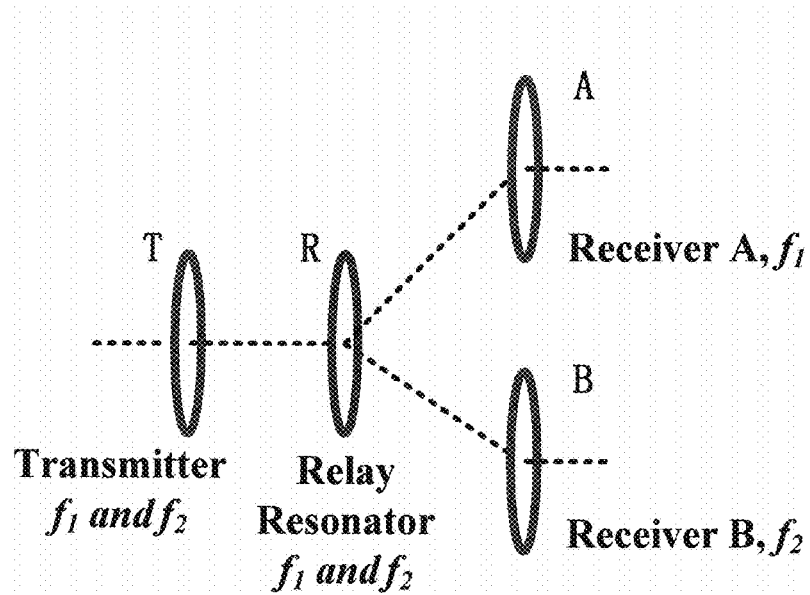
FIG. 1 is a schematic layout of a multi-frequency wireless power transfer system.
Figure 2:
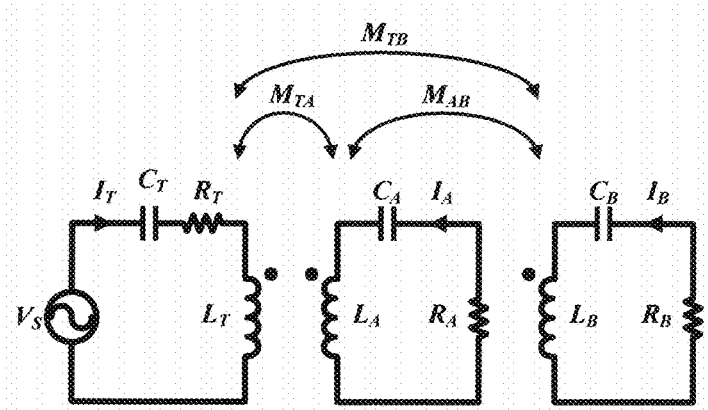
FIG. 2 is a lumped circuit model of the two-receiver system with series compensation shown in FIG. 1.
Figure 3:
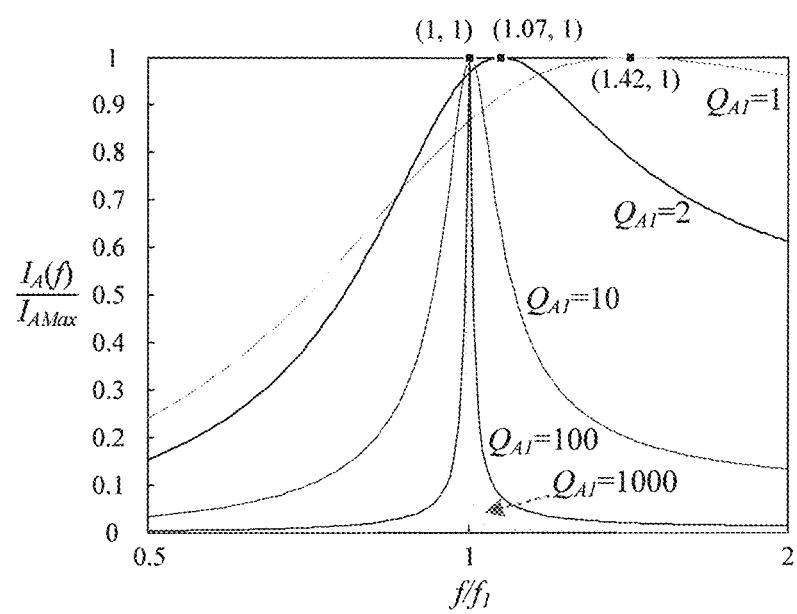
FIG. 3 shows the current variations according to the operating frequency f and the quality factor QA1 of the circuit of FIG. 2.
Figure 4:
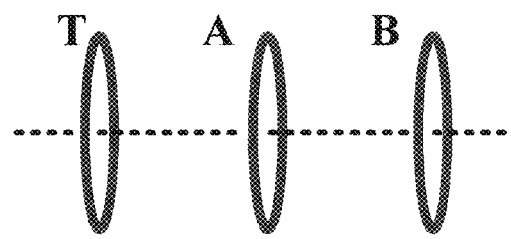
FIG. 4 shows a schematic view of a transmission path from transmitter T to resonator A and from resonator A to resonator B.

In order to demonstrate the principle of the invention, a 3-coil wireless power transfer system was set up as shown in FIG. 4. The Transmitter, Receiver-A and Receiver-B were placed in a straight line in this example. For the straight system shown in FIG. 4, the indirect path T-A-B for Resonator-B is much more significant than the direct path T-B in terms of the power transfer efficiency. Therefore, this indirect path should be utilized. However, the indirect path T-B-A for Resonator-A has negligible effect since the direct path T-A is highly efficient. Generally, if the indirect path for one of the receivers, say B, is important, it implies the coupling between T-A (part of the path T-A-B) should be stronger than that between T-B (direct path). For Resonator-A, the indirect path T-B-A is weaker because the coupling between T-B (part of T-B-A) is already weaker than that between T-A (direct path). Therefore, the indirect path T-B-A has much less contribution for power transfer than the direct path T-A.

Figure 9:
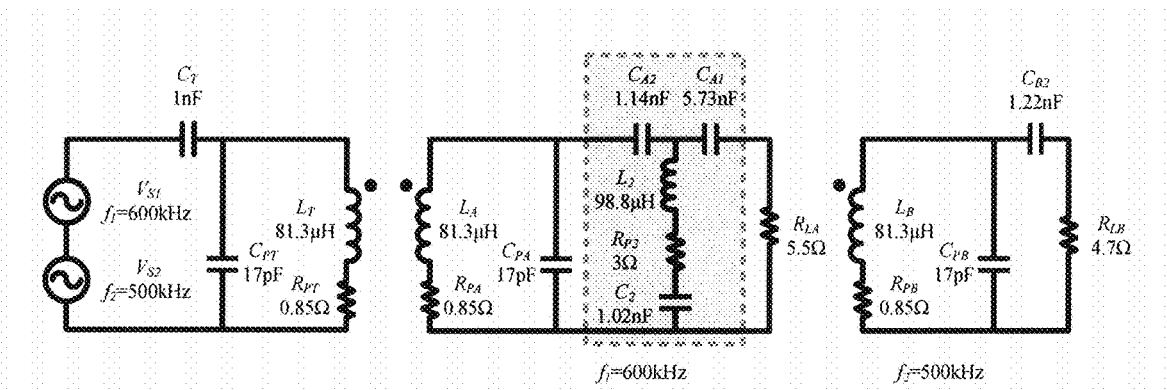
FIG. 9 is a circuit diagram of the arrangement of FIG. 4 utilizing an auxiliary circuit.

Based on the system in FIG. 4, one auxiliary circuit is used in Resonator-A. The parameters and the load resistance values are shown in the circuit diagram of the system in FIG. 9. The excitation voltage consisting of two frequencies (namely 500 kHz and 600 kHz) is used to drive the transmitter coil.

TABLE I lists the calculated and experimental results with and without the auxiliary circuit. From these results, the cross interference of the system with the proposed auxiliary circuit is much reduced when compared with those without the auxiliary circuit. With the rated output power, the power transfer efficiency (PTE) improvement is about 13% by applying the proposed auxiliary circuit.

TABLE I

COMPARISON BETWEEN CALCULATED AND EXPERIMENTAL RESULTS OF THE
STRAIGHT WPT SYSTEM WITH AUXILIARY CIRCUIT AND WITHOUT AUXILIARY CIRCUIT

|  | $P_A$ at 600 kHz | $P_B$ at 500 kHz | With Auxiliary Circuit | | | Without Auxiliary Circuit | | |
|---|---|---|---|---|---|---|---|---|
|  |  |  | $\delta_A$ | $\delta_B$ | $\eta$ | $\delta_A$ | $\delta_B$ | $\eta$ |
| Calculated | 2.5 W | 2.5 W | 0.1% | 0.4% | 66.0% | 1% | 1% | 50.1% |
|  | 0.25 W | 2.5 W | 1.1% | 0.04% | 59.9% | 10% | 0.1% | 43.3% |
|  | 2.5 W | 0.25 W | 0.01% | 3.8% | 73.4% | 0.1% | 10% | 59.5% |
| Experiment | 2.5 W | 2.5 W | 0.47% | 0.23% | 59.7% | 1.87% | 0.97% | 46.7% |
|  | 0.25 W | 2.5 W | 7.2% | 0.04% | 44.6% | 17.7% | 0.09% | 37.1% |
|  | 2.5 W | 0.25 W | 0.17% | 4.2% | 72.6% | 0.16% | 8.8% | 57.9% |

Figure 10:
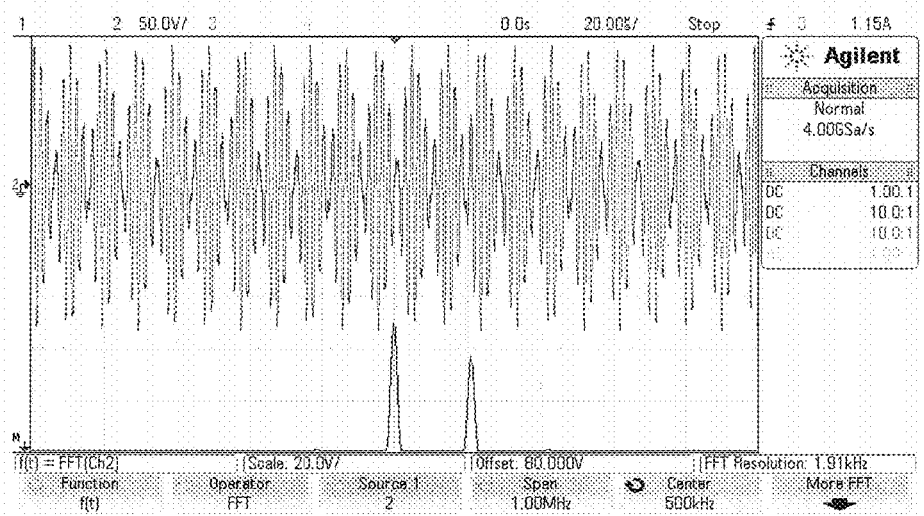
FIG. 10 shows the waveform of the input voltage of the system of FIG. 9 and its Fast Fourier Transform.
Figure 12:
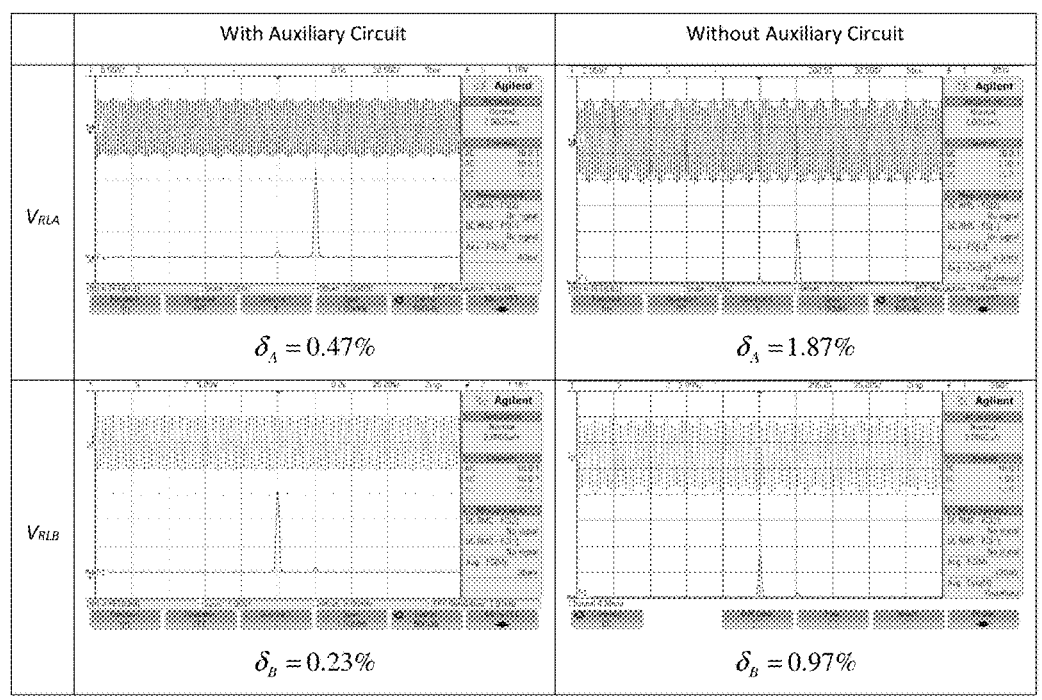
FIG. 12 shows a comparison between the interferences of the straight wireless power transfer (WPT) system with auxiliary circuit and without auxiliary circuit and with power $P_A = P_B = 2.5$ W.
Figure 13:
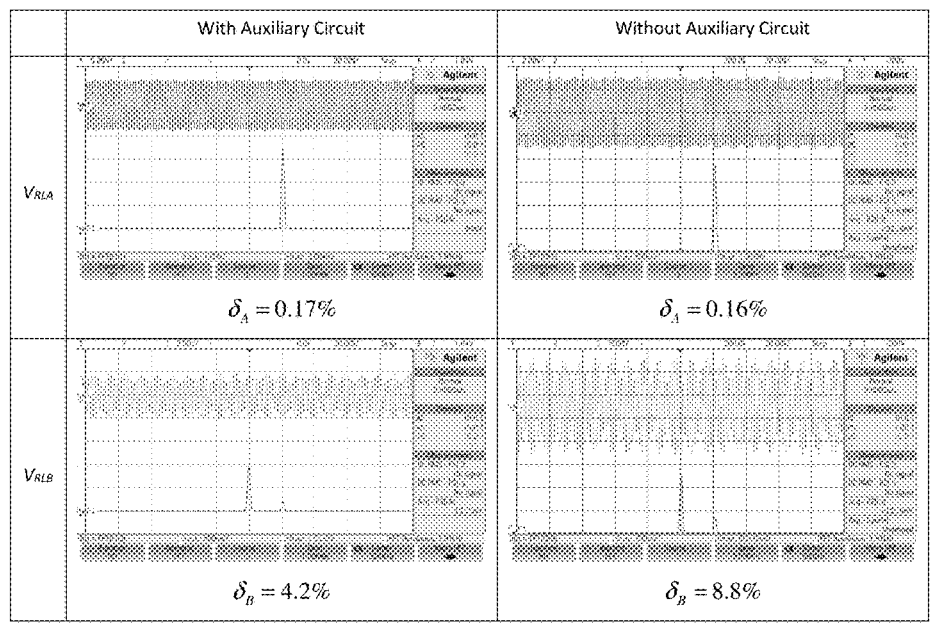
FIG. 13 shows comparison between the interferences of the straight wireless power transfer (WPT) system with auxiliary circuit and without auxiliary circuit and with power $P_A = 2.5$ W; $P_B = 0.25$ W.
Figure 14:
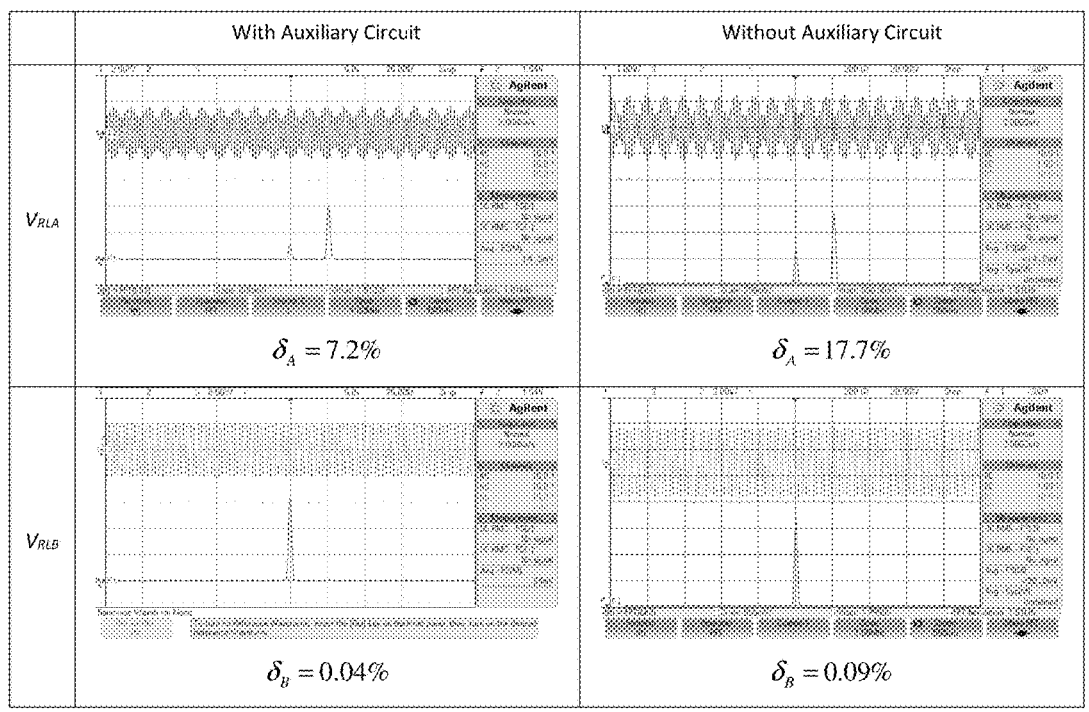
FIG. 14 shows comparison between the interferences of the straight wireless power transfer (WPT) system with auxiliary circuit and without auxiliary circuit and with power $P_A = 0.25$ W; $P_B = 2.5$ W.

FIG. 10 shows the waveform of the input voltage of the system and its Fast Fourier Transform (FFT). It is clear that the input voltage mainly includes two components 500 kHz and 600 kHz. FIGS. 12-14 show the output voltage waveform comparisons between the systems with and without the proposed auxiliary circuit.

Based on these practical measurements, it can be concluded that the auxiliary circuits are suitable for wireless power transfer systems with multi-frequency operation. The auxiliary circuits reduce the cross-interference from the power of the non-targeted frequency. At the same time, they improve the overall system energy efficiency.

Figure 11:
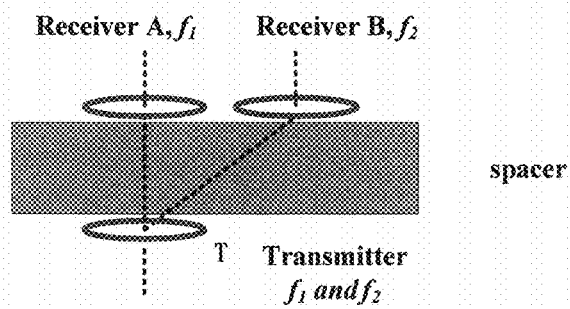
FIG. 11 shows a wireless charging table in which two receivers are designed for respective targeted frequencies.

One application example is to use the invention in the design of wireless charging platform on which two or more types of loads are charged. If different types of loads are assigned with different targeted frequencies, then the Non-Target Receiver can still improve the coupling and power flow transfer between the Transmitter and the Targeted Receiver. Take the wireless system of FIG. 11 as an example in which the two receivers are designed for respective targeted frequencies of $f_1$ and $f_2$. This example can be realized in the form of a wireless charging table on which multiple loads may be placed and charged simultaneously. When multi-frequency power excitation is provided by the Transmitter, both Receivers will receive power according to their respective targeted frequencies. With the auxiliary circuit, Receiver A will act as a relay coil for enhancing the power transfer for Receiver B. In this way the efficient power transfer range of the charger is substantially extended.

While the invention has been particularly shown and described with reference to preferred embodiments thereof, it will be understood by those skilled in the art that various changes in form and details may be made therein without departing from the spirit and scope of the invention.

We claim:

1. A wireless power transfer system for transferring power at more than one frequency, comprising:
a transmitter capable of transmitting power wirelessly at more than one frequency;
a first targeted receiver tuned to resonate and receive power at a first frequency from the transmitter and passing it to a load of the first targeted receiver;
a second non-targeted receiver tuned to resonate and receive power at a second frequency, but not passing to a load power at the first frequency from the transmitter;
an auxiliary circuit in said second non-targeted receiver in the form of a filter with reactive components to pass or block power at the first frequency to cause a part of the second non-targeted receiver to act as a resonator for the first frequency so as to relay power from the second non-targeted receiver to the first targeted receiver at the first frequency, so as to ensure proper frequency-selective wireless power flow from said second non-targeted receiver to the first targeted receiver, with pickup power retained by the second non-targeted receiver substantially reduced, even if the first and second frequencies are not widely separated.

2. The power transfer system of claim 1 wherein the auxiliary circuit acts as one of a bandpass filter to shunt power at the first frequency to ground before a load of the second receiver and a bandstop filter to prevent the flow of the power at the first frequency to the load of the second receiver.

3. The power transfer system of claim 2 wherein the second non-targeted receiver comprises a resonant inductor, a resonant capacitor and a load, wherein the load is either connected in series with the resonant inductor and capacitor, or in parallel with the resonant capacitor.

4. The power transfer system of claim 3, wherein the resonant capacitor is in the form of two capacitors connected in series with one capacitor connected to one side of the load, and
wherein the auxiliary circuit is a band-pass filter that includes the resonant capacitor, an auxiliary inductor and an auxiliary capacitor, the auxiliary capacitor and inductor are connected in series between the two capacitors of the resonant capacitor and the other side of the load.

5. The power transfer system of claim 3,
wherein the resonant capacitor is in the form of two capacitors connected in series with one capacitor connected in parallel with the load and the other capacitor connected in series with the load and the resonant inductor,
wherein the auxiliary circuit is a band-pass filter that includes the resonant capacitor, an auxiliary inductor and an auxiliary capacitor, and
wherein the auxiliary inductor and auxiliary capacitor are connected in series to form a combination and the combination is connected in parallel with the one part of the resonant capacitor and the load.

6. The power transfer system of claim 3, wherein the resonant capacitor is in the form of two capacitors with one capacitor connected in series with one side of the load, and
wherein the auxiliary circuit is a band-stop filter that includes an auxiliary inductor and an auxiliary capacitor connected in parallel with each other and connected in series with the resonant inductor at a junction and the one capacitor of the resonant capacitor, said auxiliary circuit further including the other capacitor of the resonant capacitor, which is connected between the junction of the auxiliary capacitor and inductor with the resonant inductor and the other side of the load.

7. The power transfer system of claim 3, wherein the resonant capacitor is in the form of two capacitors with one capacitor connected in parallel with the load, and the auxiliary circuit is a band stop filter that includes an auxiliary inductor and an auxiliary capacitor connected in parallel with each other and connected in series with the resonant inductor at a junction and with the load, said auxiliary circuit further including the one capacitor of the resonant capacitor and the other capacitor of the resonant capacitor, which is connected between junction of the auxiliary capacitor and inductor with the resonant inductor and the other side of the load.

8. The power transfer system of claim 1 wherein the second non-targeted receiver is merely a relay circuit.

\* \* \* \* \*